US010929675B2

(12) United States Patent
Costello et al.

(10) Patent No.: US 10,929,675 B2
(45) Date of Patent: Feb. 23, 2021

(54) DECENTRALIZED VIDEO TRACKING

(71) Applicant: NCR Corporation, Duluth, GA (US)

(72) Inventors: Christopher John Costello, Suwanee, GA (US); Sik Piu Kwan, Suwanee, GA (US)

(73) Assignee: NCR Corporation, Atlanta, GA (US)

( * ) Notice: Subject to any disclaimer, the term of this patent is extended or adjusted under 35 U.S.C. 154(b) by 393 days.

(21) Appl. No.: 15/940,669

(22) Filed: Mar. 29, 2018

(65) Prior Publication Data

US 2019/0303676 A1    Oct. 3, 2019

(51) Int. Cl.
| G06K 9/00 | (2006.01) |
| H04N 7/18 | (2006.01) |
| G06Q 30/06 | (2012.01) |
| G07G 1/00 | (2006.01) |
| G06K 9/32 | (2006.01) |

(52) U.S. Cl.
CPC ..... G06K 9/00718 (2013.01); G06K 9/00771 (2013.01); G06Q 30/0601 (2013.01); G07G 1/0009 (2013.01); H04N 7/181 (2013.01); G06K 2009/3291 (2013.01)

(58) Field of Classification Search
None
See application file for complete search history.

(56) References Cited

U.S. PATENT DOCUMENTS

| 9,858,474 | B2* | 1/2018 | Brewer | G06K 9/00302 |
| 9,912,711 | B1* | 3/2018 | Favale | H04L 65/4084 |
| 9,977,991 | B2* | 5/2018 | Chu | G06F 16/51 |
| 9,984,285 | B2* | 5/2018 | Csaszar | G06K 9/00355 |
| 10,339,379 | B2* | 7/2019 | Saptharishi | G06K 9/52 |
| 10,360,599 | B2* | 7/2019 | Costello | G06Q 20/20 |
| 10,634,506 | B2* | 4/2020 | Hill | G06Q 30/00 |
| 2004/0130620 | A1* | 7/2004 | Buehler | G06K 9/32 348/143 |
| 2013/0208124 | A1* | 8/2013 | Boghossian | G06K 9/3241 348/159 |
| 2016/0191865 | A1* | 6/2016 | Beiser | G06K 9/00778 348/156 |
| 2017/0251261 | A1* | 8/2017 | James | H04N 21/4725 |
| 2018/0197052 | A1* | 7/2018 | Yanson | G06K 19/06037 |
| 2020/0134855 | A1* | 4/2020 | Zucker | G06T 7/90 |

* cited by examiner

*Primary Examiner* — Anand P Bhatnagar
(74) *Attorney, Agent, or Firm* — Schwegman, Lundberg & Woessner (57) ABSTRACT

Decentralized cameras perform video tracking on captured video. The cameras produce metadata representing tracking of objects from the captured video. The metadata is passed between the cameras as the object moves within the captured video. Final metadata from at least one of the cameras is sent to a server, the server processes the final metadata to produce a summary of the object tracking and process one or more automated actions based on the summary.

19 Claims, 4 Drawing Sheets

DECENTRALIZED VIDEO TRACKING

BACKGROUND

Standard computer vision techniques are performed by attaching 1 or more cameras to a Personal Computer (PC)/server, streaming the video into that Central Processing Unit (CPU), and then processing the information. This is inefficient for numerous reasons: communicating that much raw data is unnecessary, performing standard image processing is expensive, etc.

An initial step in building a frictionless store is proper design of an overhead camera system. This is required to track all the people around the environment as well as determine the actions people are performing. Typical camera systems stream numerous cameras into one location (a single server). This requires expensive servers to handle the load as well as creating communication challenges in obtaining reliable results in real time.

To better illustrate the processing and storage problem, assume a large retail store has 15 aisles. Assume each aisle will need 10 cameras to fully monitor. This means a total of 150 raw data streams of images are flowing into the typical data processing unit. Now assume the cameras are running at 15 frames per second and each frame has a Video Graphic Array (VGA) resolution (640×480) in color. This means the communication requirement is "691 Megabytes/sec." That data must also then perform complex calculations while maintaining real time speeds. The only way to reasonably process that much data is with multiple servers. This is a very expensive problem and retailers are unwilling to require a server farm in each store as a viable solution.

In fact, current solutions would likely force stores to: employ a significant Information Technology (IT) staff, reduce available retail space to accommodate hardware servers and the IT staff, and substantially increase operational expenses on staff and equipment. As a result, very few stores have deployed computer vision in any significant sense so as to permit a frictionless store and enhanced security monitoring.

SUMMARY

In various embodiments, methods and a system are provided for decentralized video tracking and monitoring.

According to an embodiment, a method for real-time video tracking is provided. Specially, and in an embodiment, attributes are assigned to an object detected in video frames. A unique identifier is received to associate to the attributes. Metadata is created for the attributes. Finally, the unique identifier and metadata are passed to a next processing instance of the method for tracking the object within next video frames captured by the next processing instance.

DETAILED DESCRIPTION

Figure 1:
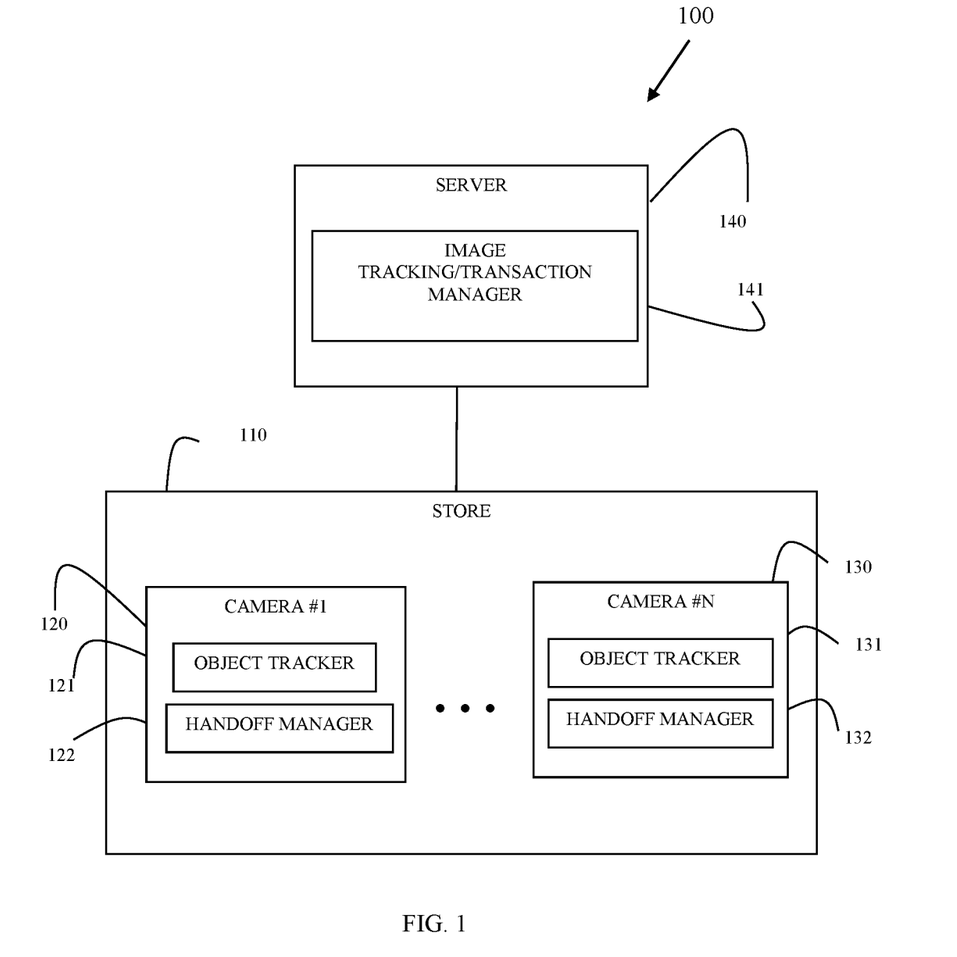
FIG. 1 is a diagram illustrating components of a real-time decentralized vide tracking and monitoring system, according to an example embodiment.

FIG. 1 is a diagram illustrating components of a real-time decentralized vide tracking and monitoring system 100, according to an example embodiment. It is to be noted that the system 100 is shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of real-time video tracking and monitoring, presented herein and below.

Furthermore, the techniques and the systems presented herein and below (for real-time video tracking and monitoring) may include all or some combination of the components shown with the system 100. The methods are programmed as executable instructions in memory and/or non-transitory computer-readable storage media and executed on one or more processors associated with the components/devices.

Specifically, the system 100 includes a store 100 that includes a plurality of cameras 120 and 130 (1-N cameras). Each camera 120 and 130 includes one or more processors, memory, and non-transitory computer-readable storage. The processors of each camera 120 and 130 execute computer instructions representing an object tracker 121 and 131 and a communication handoff manager 122 and 132. The cameras 120 and 130 also include network circuitry for connecting and communication with a server 140. The server 140 includes a processor, memory, and non-transitory computer-readable storage. The server's processor executes computer instructions representing an image tracking/transaction manager 141.

Each camera (120 or 130) may include its own processing node or two to four cameras (120 and/or 130) may share a common processing node. As such as used herein, camera (120 or 130) refers to a processing node having: one or more image sensors/cameras, one or processors that execute the object tracker 121 and 131, and the handoff manager 122 and 132. Moreover, each processing node includes wired and/or wireless network circuitry for communicating with other processing nodes and/or the image tracking/transaction manager 141 of the server 140. Additionally, the camera (120 and 130) can be 2D (two-dimensional) or 3D (three-dimensional) compatible and/or enabled.

Each processing node has limited functionality and power consumption. The processing nodes are small computing devices that are inexpensive and customized for image processing and limited network communication. Each processing node if further configured and hardware designed for processing Packet Video Protocol (PVP) and image processing. Each processing node also includes an administrative interface for installing and configuring the object trackers 121 and 131 and the handoff managers 122 and 132.

In an embodiment, each processing node is a small and inexpensive device that is part of the Internet-Of-Things (IoTs) hardware designed and software configured to process the decentralized video tracking and monitoring through the object trackers 121 and 131 and the handoff managers 122 and 132.

The imaging sensors are integrated into the motherboard of the processing nodes comprising the cameras 110 and 120. The hardware customized to perform PVP and image processing. The processing nodes also include storage for storing compressed video. In an embodiment, the imaging sensor is not integrated into the motherboard but is rather included or resides within a housing of the processing node.

Again, 1 to 4 imaging sensors may be integrated into a single processing node. In such cases, the processing nodes has 1 to 4 cameras that the processing nodes handles for image processing. In an embodiment, some of the imaging sensors are external to the processing node's housing.

The cameras 120 and 130 are affixed overhead throughout aisles of the store 110 and above entry and exit points. The cameras 120 are networked together either through wireless or a wired connection. Each camera 120 and 130 represents a processing node (or as discussed above 4 cameras can collectively represent a single processing node).

Operation of the decentralized video tracking and monitoring will now be discussed with some illustrative examples.

If the store 110 is a frictionless store (a store where a customer comes in and selects items for purchase and exits with transaction processing occurring without any customer or clerk actions for payment and checkout being required), the entryway of the store 110 is equipped with an automated check-in mechanism for customer identification.

The automated check-in mechanism can include a variety of techniques, such as: 1) the customer scanning a barcode (or Quick Response (QR) code) that triggers an application that executes on the mobile device to report a customer identifier for the customer to the server 140, 2) mobile device identification based on the mobile device reporting its physical location to the server 140 (such as through a mobile application executing on the mobile device) wherein the mobile device identifier for the mobile device is registered to the customer, 3) biometrics where the customer touches a fingerprint reader and the biometrics registered to the customer, 4) facial recognition where the customer's face image and face biometrics are registered with the server, etc.

An entryway overhead camera or cameras 120 and 130, captures image attributes from images of the customer during the automated check-in mechanism. These attributes can include such things as color of clothing being worn by the customer, dimensions of the customer (height and width from the customer image), and/or coordinates of an outline of customer image. The attributes comprise a small amount of data, such as 10 to 20 bytes of data representing a unique "blob" detected by the entryway camera 120 or 130.

Once the customer is checked in with a known customer identifier, the image tracking/transaction manager 141 assigns a unique identifier for each camera 120 and 130 to track and monitor the customer while in the store 110. The initial entryway camera 120 or 130 receives from the image tracking/transaction manager 141 the unique identifier and the object tracker 121 or 131 links the unique identifier to the blob (small amount of image attributes associated with the customer).

It is also to be noted that a unique identifier can be obtained from the server 140 when the customer is unknown (anonymous) and/or not registered with the server 140. This permits video/image tracking of a unique person whose identity is not registered with the server 140. The object tracker 121 or 131 links the unique identifier to the blob.

The entryway camera 120 or 130 immediately passes the unique identifier and the small amount of image attributes (blob) as metadata to one or more next cameras 120 or 130 through the handoff manager 122 or 132. These next cameras 120 or 130 receive the metadata from their handoff manager 122 or 132 where it is passed to their object tracker 121 or 131 for processing the metadata to quickly and efficiently in order to recognize the blob within the field-of-view of those next cameras 120 or 130 from images captured in video frames by those next cameras 120 or 130. The object tracker 121 or 131 also expands on the metadata when the customer removes an item from a shelf within the store 110 by providing the coordinates from the images where an item was removed from a shelf, dimensions, of the item, color of the item. So, as the customer traverses the store and removes items for purchase the amount of metadata being passed through the handoff managers 122 and 132 to one another grows slightly.

This workflow continues through the image processing performed by the object trackers 121 and 131 and the handoff managers 122 and 132 until a final object tracker 121 or 131 detects the blob assigned to the unique identifier leave the store 110. The final handoff manager 122 or 132 then sends the final metadata (blob, unique identifier, item selected metadata to the image tracking/transaction manager 141. In an embodiment, the object trackers 121 and 131 can send the metadata to the manager 141 once captured so that the manager 141 has a full and real-time complete record of all the metadata as captured by the trackers 121 and 131; this also provides redundancy of the metadata.

Each object tracker 121 and 131 also compresses the actual video of the customer while in the store into its local storage on its local processing node. This is saved as an audit trail of a customer's visit to the frictionless store 110. This can be dynamically pulled from the image tracking/transaction manager 141 from the cameras 120 and 130 during periods of decreased store traffic, on demand, when the customer leaves the store 110, and/or based on a policy. The video is compressed and is not required to be sent over the network during the customer's visit to the store. The retrieved video by the image tracking/transaction manager 141 can also be processed for confirming a customer transaction or processed as a rebuttal evidence should a customer dispute a charge for a give item after the customer's visit to the store 110.

It is noted that the metadata collected for the processed images from the video captured during the customer's visit includes data and time stamps and camera identifiers for each of the cameras 120 and 130 that created, added to, or deleted from the metadata. A deletion from the metadata may occur when a customer picks an item for purchase in one aisle of the store 110 and places the item back on a different shelf in a different aisle of the store 110. The metadata can also reveal that a customer that drops an item at a different location within the store 110 may backtrack and re-pickup that same item from the different location, such that the metadata is deleted for reference to the item but then metadata associated with the item is added back when the customer re-picks up that item at a later point while shopping in the store 110.

The image tracking/transaction manager 141 is preconfigured to identify each camera's 120 and 130 known field-of-view and known location within the store 110 for the known field-of-view (specific aisle, specific shelves within that aisle, and specific products on those specific shelves). This permits the image tracking/transaction manager 141 to identify from the final metadata received from the final handoff manager 122 or 132 and resolve specific items (goods) that the customer (blob with unique identifier) took into their possession while in the store 110 for purchase. This processing can be done on metadata and not an entire video log of the customer's visit. Therefore, it is quickly and efficiently processed by the image tracking/transaction manager 141.

The image tracking/transaction manager 141 is networked to the store's customer database and item database (which includes each item's aisle location and shelf location within that aisle). The image tracking/transaction manager 141 processes the metadata to identify specific camera's 120 and 130 that modified the metadata in some way (through the cameras' unique identifier) to search the item database for specific items that the customer left the store 110 with and acquire item prices and item details. A transaction is created listing the items purchased and the prices along with a total price (including a store identifier for the store and a data and time stamp). The unique identifier assigned originally when the customer was identified in the store 110 is used by the image tracking/transaction manager 141 to link to a specific customer and search the customer database to obtain the customer's registered payment method. The payment method and the transaction are processed (this may include third-party credit card processing) to complete the customer transaction.

It is noted that a customer that was not identified (was anonymous) or unable to be associated with a known customer can cause the image tracking/transaction manager 141 to send an alert to store personnel as soon as a customer enters the store 110 (before that anonymous customer's shopping). This customer can be approached by such personnel before the customer is allowed to exit the store 110 and asked to checkout and pay for such goods before leaving the store 110.

It is to be noted that the above-noted processing can be used for security purposes as well to detect and thwart theft by having the anonymous customer to through a traditional checkout lane (friction-based store with traditional checkout processes). Again, alert processing can be implemented by the image tracking/transaction manager 141 to verify a thief checking out through a Point-Of-Sale (POS) terminal or a Self-Service Terminal (SST) by the image tracking/transaction manager 141 receiving transaction information in real-time from the POS or SST and cross referencing the items purchased with what was detected from the metadata supplied by the cameras 120 and 130 (here the final handoff manager 122 or 132 reports to the image tracking/transaction manager 141 when the customer (blob with unique identifier) is detected at the POS or SST. If the customer does not go to a SST or POS terminal to do any checkout, a final handoff manager 122 or 132 can be situated near the exit point permitting the image tracking/transaction manager 141 to raise electronic alerts to store devices and personnel (such as causing a buzzer or alarm to sound) so that store personnel can address the theft in progress. In other cases, the customer can checkout utilizing a mobile application on the customer's operated mobile device (such as a phone, a wearable processing device, a tablet, etc.).

One now appreciates how a plurality of cameras 120 and 130 (processing nodes) can perform decentralized video image tracking and monitoring processing and communicate with one another through metadata passing of small chunks of data. The metadata as it is passed is modified (added to or deleted from). Before a customer associated with the metadata leaves a store, the metadata is provided to a server. The server can processes a small amount of metadata rapidly to identify purchases of a customer in a frictionless store, identify theft during a checkout at a POS terminal or a SST, and alert store devices and personnel to theft in a frictionless store or a traditional store. Conventionally, this processing was only achieved through passing and processing voluminous amounts of video data in a centralized server-based approach, which was processor/memory intensive, network bandwidth intensive, and largely incapable of being processed in real time for real life situations.

The techniques are decentralized because each camera 120 and 130 performs its own image processing on its processing node, which is greatly assisted through the metadata passing between cameras 120 and 130.

Furthermore, a full audit log for the video history of a customer within a store can be reconstructed by the image tracking/transaction manager 141 pulling the compressed stored video history from each of the cameras 120 and 130. This network traffic can be controlled and pulled when the store 110 is closed or during low customer traffic periods.

Each camera 120 and 130 is a specialized hardware device designed for efficient image processing with communication capabilities (wired and/or wireless) with scaled down hardware and a low power consumption footprint. Such that, each camera 120 and 130 is inexpensive and customized to perform the processing discussed above through the object trackers 121 and 131 and the handoff managers 122 and 132.

Again it should be noted that captured video frames are not transmitted over the network during the object/customer tracking between the cameras 120 and 130 and from the cameras 120 and 130 to the server 140. This substantially decreases network bandwidth and substantially improves the processing throughput for real-time video tracking and monitoring.

In an embodiment, the processing nodes or select ones of the processing nodes may include additional sensors besides just imaging sensors, such a Far Infrared (FIR) sensor.

The above-discussed embodiments and other embodiments are now discussed with reference to the FIGS. 2-4.

Figure 2:
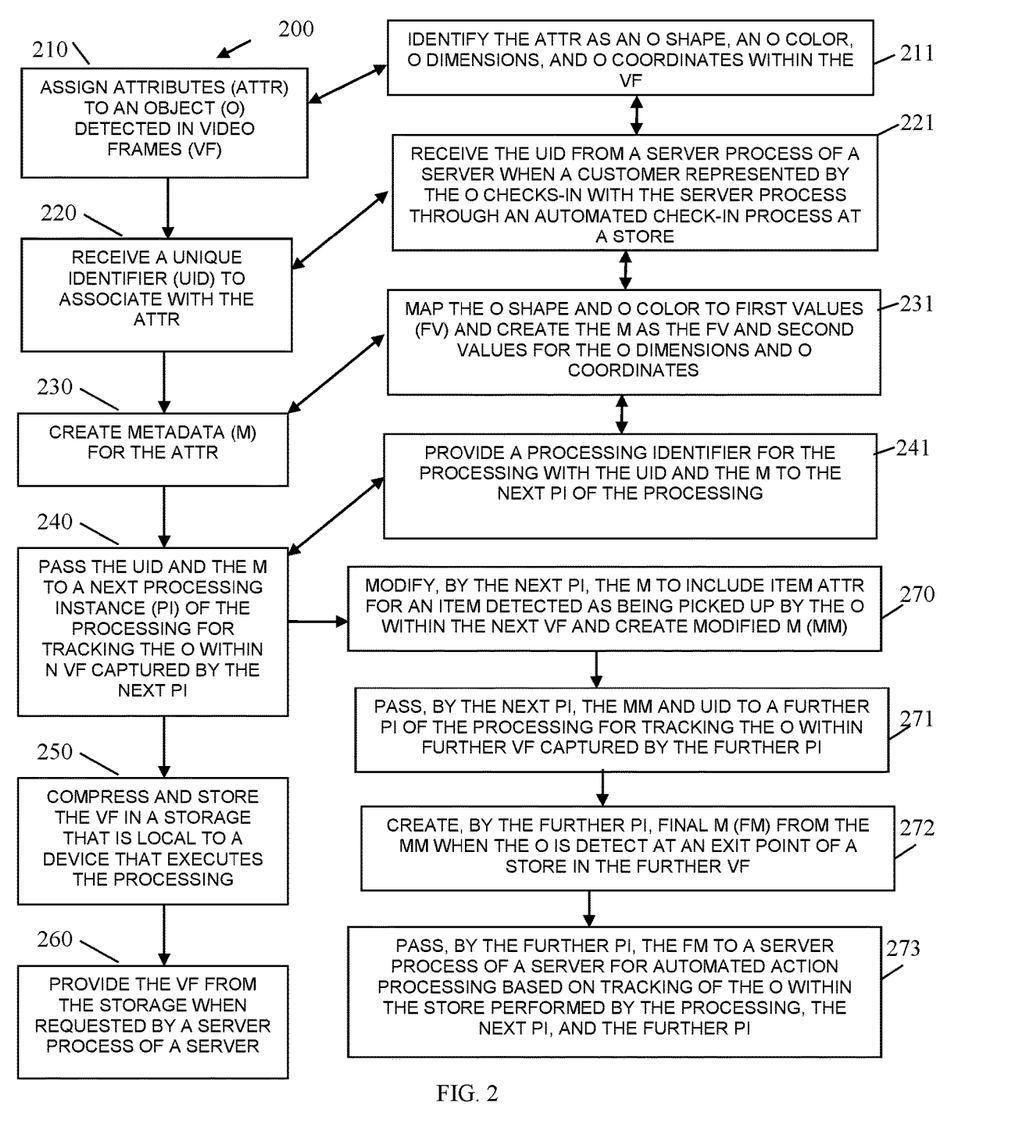
FIG. 2 is a diagram of a method for real-time video tracking, according to an example embodiment.

FIG. 2 is a diagram of a method 200 for real-time decentralized video tracking, according to an example embodiment. The software module(s) that implements the method 200 is referred to as a "decentralized video agent." The decentralized video agent is implemented as executable instructions programmed and residing within memory and/or a non-transitory computer-readable (processor-readable) storage medium and executed by one or more processors of a device. The processor(s) of the device that executes the decentralized video agent are integrated with one or more image sensors/cameras and are specifically designed, configured, and programmed to process the decentralized video agent. The decentralized video agent may have access to a network during its processing. The network can be wired, wireless, or a combination of wired and wireless.

In an embodiment, the device that executes the decentralized video agent is one of the cameras 120 or 130 (one of the processing nodes).

In an embodiment, the decentralized video agent is the object manager 121/131, and the handoff manager 122/132.

The device that executes the decentralized video agent includes one to four integrated imaging sensors/cameras (integrated into the motherboard of the device).

In an embodiment and during the processing of the decentralized video agent, the device that executes the decentralized video agent is situated overhead of customers within a store.

At 210, the decentralized video agent assigns attributes to an object detected in video frames based on image processing that includes shape recognition from images of the video frames and edge detection processing from the shape recognition.

In an embodiment, at 211, the decentralized video agent identifies the attributes as an object shape, an object color or colors, object dimensions, and object coordinates within the video frames.

At 220, the decentralized video agent receives a unique identifier to associate with the attributes.

In an embodiment of 211 and 220, at 221, the decentralized video agent receives the unique identifier from a server process of a server when a customer represented by the object checks-in with the server process through an automated check-in mechanism at a store. The automated check-in mechanism can be any of the mechanisms discussed above with the FIG. 1. In an embodiment, the server is the server 140 and the server process is the image tracking/transaction manager 141.

At 230, the decentralized video agent creates metadata for the attributes. This metadata is a small amount of data and is not video frame data; rather, it is data about the video frame data. As discussed above with the FIG. 1, the size of the metadata can be roughly or approximately 10-20 bytes of data.

In an embodiment of 221 and 230, at 231, the decentralized video agent maps the object shape and the object color to first values and creates the metadata as the first values and second values for the object dimensions and object coordinates. That is, predefined shapes and colors can be assigned as a single number or byte for representation within the metadata for purposes of reducing the size of the metadata.

At 240, the decentralized video agent passes the unique identifier and the metadata to a next processing instance of the decentralized video agent for tracking the object within next vide frames captured and processed by the next processing instance. The next processing instance executes on a different camera (processing node) from that which is associated with the decentralized video agent.

In an embodiment of 231 and 240, at 241, the decentralized video agent provides a processing identifier for the decentralized video agent with the unique identifier and the metadata to the next processing instance.

In an embodiment, at 250, the decentralized video agent compresses and stores the video frames in a storage that is local to the camera device that executes the decentralized video agent.

In an embodiment of 250 and at 260, the decentralized video agent provides the video frames from the storage when requested by a server process of a server. In an embodiment, the server is the server 140 and the server process is the image tracking/transaction manager 141. The video frames are pulled by the server process during periods where the store is closed or where there is low customer traffic at the store, which reduces network bandwidth over the network.

In an embodiment, at 270, the next processing instance of the decentralized video agent modifies the metadata to include item attributes for an item detected as being picked up by the object within the next video frames being captured and being processed by the next processing instance. The next processing instance then creates modified metadata to include the item attributes.

In an embodiment of 270 and at 271, the next processing instance passes the modified metadata and the unique identifier to a further processing instance (third processing instance) for tracking the object within further video frames (third video frames) captured by the third processing instance. The third processing instance processing on a camera (processing node that is different from the decentralized video agent and the next processing instance (second processing instance)).

Multiple other next processing instances can perform similar processing to that which was described at 270 and 271 for the next processing instance to further modify the metadata with additional items taken by the object and pass the further modified metadata along to other next processing instances of the decentralized video agent.

It is also noted that the any number of next processing instances can process more than one time while performing video tracking of the object. This can occur when a customer (represented by the object) backtracks to an aisle of the store where the customer has already been once (or more than once) before.

At some point, the object (customer) is detected as approaching an egress point of the store. For purposes of illustration this is identified by the further processing instance, in an embodiment of 271, at 272. The further processing instance creates final metadata from the modified metadata when the object (customer) is detected at or proximate to an exit point of the store within the further (third) video frames.

In an embodiment of 272 and at 273, the further (third) processing instance passes the final metadata to a server for automated action processing based on the tracking of the object within the store performed in a decentralized manner by the decentralized video agent, one or more next processing instances, and the further processing instance.

The processing performed by a server process of the server was discussed above with respect to the FIG. 1 and the server 140 and the image tracking/transaction manager 141. This processing of the server process is also now discussed with reference to the FIG. 3 and the method 300.

Figure 3:
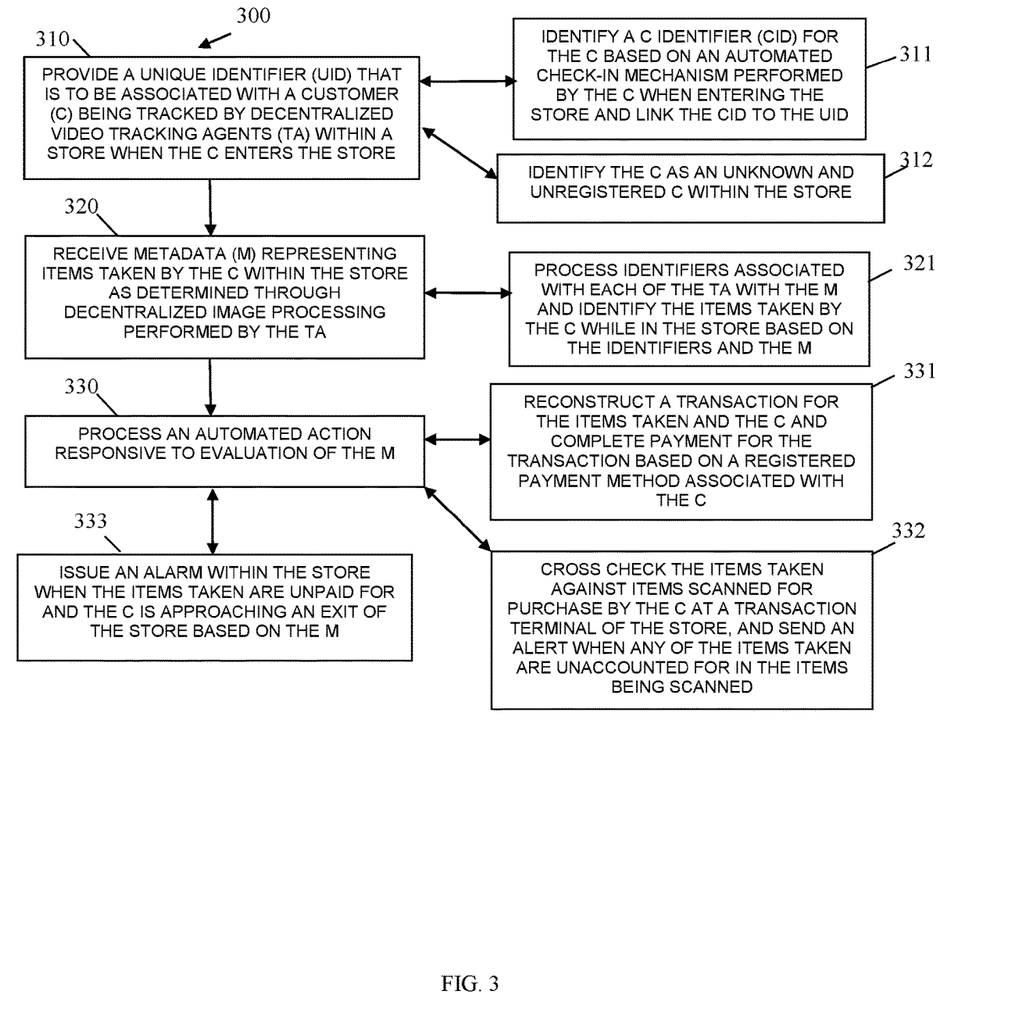
FIG. 3 is a diagram of another method for real-time video tracking, according to an example embodiment.

FIG. 3 is a diagram of another method 300 for real-time decentralized video tracking, according to an example embodiment. The software module(s) that implements the method 300 is referred to as a "real-time video tracker." The real-time video tracker is implemented as executable instructions programmed and residing within memory and/or a non-transitory computer-readable (processor-readable) storage medium and executed by one or more processors of a hardware device. The hardware processors that execute the real-time video tracker include are specifically configured and programmed to process the real-time video tracker. The real-time video tracker may have access to one or more networks during its processing. Each network can be wired, wireless, or a combination of wired and wireless.

The real-time video tracker interacts with one or more instances of the decentralized video agent of the method 200.

In an embodiment, the device that executes the real-time video tracker is the server 140

In an embodiment, the real-time video tracker is the image tracking/transaction manager 141.

At 310, the real-time video tracker provides a unique identifier that is to be associated with a customer being tracked by decentralized video tracking agents within a store when a customer enters the store. In an embodiment, each instance of the decentralized video tracking agents is the object tracker 121/131 and/or an instance of the method 200.

In an embodiment, at 311, the real-time video tracker identifies a customer identifier for the customer based on an automated check-in mechanism performed by the customer (or automatically performed through a device carried by the customer or automatically performed through facial recognition) when the customer enters the store. The real-time video tracker links the customer identifier to the provided unique identifier. That is, the decentralized video tracking agents do not have to know and in some cases do not know or possess the actual customer identifier; rather, the real-time video tracker maintains this linkage and provides the unique identifier to at least one (initial or first) decentralized video tracking agent.

In an embodiment, at 312, the real-time video tracker identifies the customer as an unknown and unregistered customer within the store. That is, the real-time video tracker is unable to determine a customer identity for the customer, which means either the automated check-in failed or the customer is unregistered with the store. This type of anonymous customer is still tracked while in the store by the decentralized video tracking agents and the real-time video tracker.

At 320, the real-time video tracker receives metadata representing items taken by the customer within the store and including the unique identifier. The metadata determined and produced by the decentralized video tracking agents through image processing performed by the decentralized video tracking agents.

In an embodiment, at 321, the real-time video tracker processes identifiers associated with each of the decentralized video tracking agents with the metadata and the unique identifier. The identifiers allow the real-time video tracker to determine the physical locations of cameras for each of the tracking agents, the field-of-views for each tracking agent, and item attributes (including coordinates) for the real-time video tracker to identify items taken by the customer while in the store based on the unique identifier, the identifiers, and the metadata. This is done without the real-time video tracker performing image processing on video frames and therefore has a high processing throughput for resolving the items taken by the customer.

At 330, the real-time video tracker processes an automated action responsive to evaluation of the metadata performed by the real-time video tracker (as discussed above in 320 and 321).

In an embodiment, at 331, the real-time video tracker reconstructs an entire transaction for the items taken and the customer and completes payment for the transaction based on a registered payment method associated with the customer. That is, once the items taken are identified, the real-time video tracker interacts with a store item database to obtain item descriptions and item pricing and generates a receipt and a total price for the transaction. Then, the real-time video tracker accesses a customer database using the customer identifier (which was mapped by the real-time video tracker to the unique identifier and in an embodiment where the customer is registered with the store) to obtain a customer record that includes the customer's registered payment method for the transaction. Third-party payment services may then be used to complete and verify the payment processing for the transaction. In some cases, based on a customer profile associated with the customer record, the real-time video tracker can cause a transaction receipt to be emailed or texted to the customer or a registered customer device.

In an embodiment, at 332, the real-time video tracker cross checks the items taken against items being scanned for purchase by the customer at a transaction terminal of the store (POS terminal (cashier assisted) or SST (customer performed)). The transaction terminal providing real time item scan information to the real-time video tracker, which the real-time video tracker uses to remove specific items from a list associated with the items taken. The real-time video tracker sends an alert to staff devices for any of the items taken that are unaccounted for in the items that were scanned when the customer attempts to end the transaction and pay for the items that were scanned on the transaction terminal. In some cases, the alert causes the POS terminal or SST to not permit transaction checkout and a message is displayed indicating the unaccounted for items for customer resolution.

In an embodiment, at 333, the real-time video tracker issues an alarm within the store on store equipment when the items taken are unpaid for and the customer is approaching an exit (egress) of the store based on the metadata received from one of the tracking agents that is located in the exit area of the store.

Figure 4:
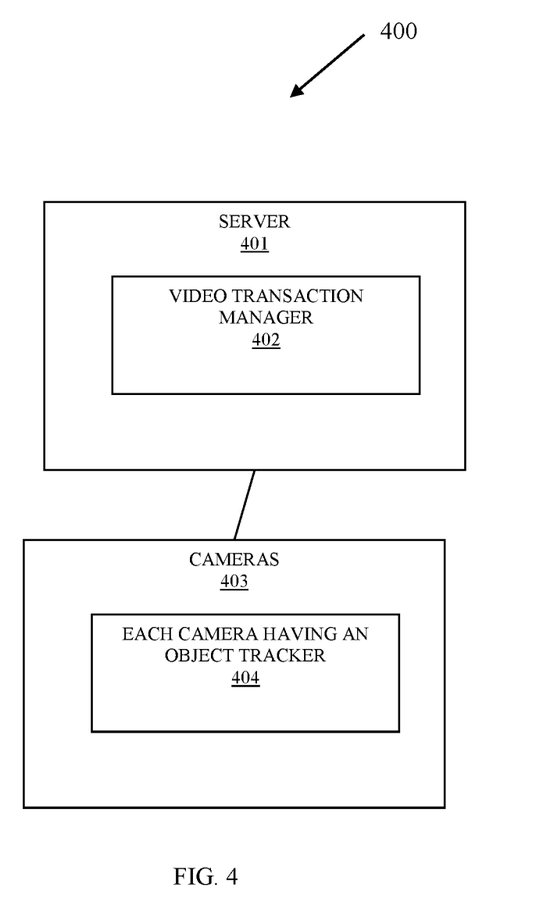
FIG. 4 is a diagram of another system for real-time video tracking and monitoring, according to an example embodiment.

FIG. 4 is a diagram of another system 400 for real-time video tracking and monitoring, according to an example embodiment. Some components of the system 400 are programmed and reside within memory and/or a non-transitory computer-readable medium and execute on one or more processors of multiple devices of the system 400. The system 400 communicates over one or more networks, which can be wired, wireless, or a combination of wired and wireless.

In an embodiment, the system 400 is the system 100.

In an embodiment, the system 400 implements, among other things, the processing discussed in the FIGS. 1-3.

The system 400 includes a server 401 having a video transaction manager 402 and a plurality of cameras 403, each having an object tracker agent 404.

In an embodiment, the video transaction manager 402 is the image tracking/transaction manager 141.

In an embodiment, the video transaction manager 402 is the method 300.

In an embodiment, the object tracker agent 404 is one of the cameras 120 or 130.

In an embodiment, the object tracker agent 404 is the method 200.

In an embodiment, the cameras 403 are the cameras 120 and 130. In an embodiment, one of the cameras 403 is a processing node as discussed above with the FIG. 1. In an embodiment, 1-4 of the cameras 403 share a same processing node as discussed above with the FIG. 1.

The video transaction manager 402 is configured to: i) provide a unique identifier for a customer to a first one of the object tracker agents 404, ii) receive final metadata from at least one of the object tracker agents 404, iii) process the final metadata to identify items taken by the customer, and iv) process an automated action based at least in part on the items taken.

In an embodiment, the video transaction manager 402 is further configured in, iv), process the action to one of: complete a transaction and payment for the transaction based on the items taken, verify a transaction terminal transaction of the customer based on the items taken, and raise an alert or an alarm based on a location for the last one of the object tracker agents and the items taken. In an embodiment, the transaction terminal is a SST. In an embodiment, the transaction terminal is a POS terminal.

Each of the object trackers are configured to: a) link the unique identifier to metadata, b) perform image processing on video frames captured by the camera 403 associated with that object tracker 404, c) produce, modify, or delete portions of the metadata, d) produce final metadata from the metadata, and e) deliver the final metadata to the video transaction manager 402 as a record that identifies movement and actions taken by the object detected in the video frames.

The object trackers 404 are organized in a network and pass the metadata between one another. Each object tracker 404 uses received metadata to rapidly identify the object representing a customer from images in the video frames captured by that tracker's camera 403. The images are then processed by each tracker 404 to identify items selected or taken by the customer for purposes of augmenting and modifying the metadata. In some cases, an item can be dispossessed by the customer in which case the metadata representing that item is deleted from the metadata.

Only the object trackers 404 perform image processing on the video frames that their cameras 403 capture. The cameras 403 are specially designed hardware devices for image processing. This makes image processing quick and efficient and substantially reduces network bandwidth associated with passing video frame data through the network. The object trackers are decentralized and cooperate performing a configured workflow for tracking the customer within a store (enterprise).

Video frames (video) is not passed between the trackers 404 during processing and are not passed to the transaction manager 402 during the object tracking. The raw video frames captured by each tracker 404 is locally stored on storage for that tracker's camera 403 (processing node) and can be provided out-of-band to the transaction manager 402 when requested by the transaction manager 402. The raw video frames can be in a compressed format and the transaction manager 402 can reconstruct an entire video dialogue or history of the customer's visit for any give transaction for audit purposes (such as non-repudiation of a customer transaction when in dispute with a customer) and/or as a mechanism to verify accuracy of the object tracking processing.

The final metadata is a small amount of data that the video transaction manager 402 can rapidly process to create a history and identify items taken by the customer while in the store. The transaction manager 402 can process the metadata along with identifiers for each of the cameras 403 that modified the metadata and interact with backend database to construct a transaction for a customer including item prices and item descriptions for the items taken, and completing a payment transaction by processing a customer-registered payment method. The video transaction manager 402 can also processing the metadata to cross reference and verify a checkout of a customer through a traditional fiction-based store (at a SST or POS terminal). Still further, the video transaction manager 402 can process the action as a mechanism for raising alarms or sending notifications to store equipment when theft is suspected by the customer based on the metadata. In an embodiment, the video transaction manager 402 can process multiple actions for a frictionless-store transaction, verifying a transaction terminal transaction, and raising automated alarms or sending alerts for theft prevention.

In an embodiment, the action processed by the transaction manager 402 is for inventory management and control for identifying items removed from stock from a store or a warehouse and for interacting with an inventory control system that tracks the items and the inventor for the items for the store or warehouse.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   assigning attributes to an object detected in video frames;
   receiving a unique identifier to associate to the attributes;
   creating metadata for the attributes;
   passing the unique identifier and the metadata to a next processing instance of the method for tracking the object within next video frames captured by the next processing instance; and
   modifying, by the next processing instance, the metadata to include item attributes for an item detected as being picked up by the object within the next video frames and creating modified metadata.

2. The method of claim 1 further comprising, compressing and storing the video frames in a storage that is local to a device that executes the method.

3. The method of claim 2 further comprising, providing the video frames from the storage when requested by a server process of a server.

4. The method of claim 1 further comprising, passing, by the next processing instance, the modified metadata and the unique identifier to a further processing instance of the method for tracking the object within further video frames captured by the further processing instance.

5. The method of claim 4 further comprising, creating, by the further processing instance, final metadata from the modified metadata when the object is detected at an exit point of a store within the further video frames.

6. The method of claim 5 further comprising, passing, by the further processing instance, the final metadata to a server process of a server for automated action processing based on tracking of the object within the store performed by the method, the next processing instance, and the further processing instance.

7. The method of claim 1, wherein assigning further includes identifying the attributes as an object shape, an object color, object dimensions, and object coordinates within the video frames.

8. The method of claim 7, wherein receiving further includes receiving the unique identifier from a server process of a server when a customer represented by the object checks in with the server process through an automated check-in process at a store.

9. The method of claim 8, wherein creating further includes mapping the object shape and object color to first values and creating the metadata as the first values and second values for the object dimensions and object coordinates.

10. The method of claim 9, wherein passing further includes providing a method identifier for the method with the unique identifier and the metadata to the next processing instance.

11. A method, comprising:
providing a unique identifier that is to be associated with a customer being tracked by decentralized video tracking agents within a store when the customer enters the store;
receiving metadata representing items taken by the customer within the store as determined through decentralized image processing performed by the decentralized video tracking agents; and
processing an action responsive to evaluation of the metadata.

12. The method of claim 11, wherein providing further includes identifying a customer identifier for the customer based on an automated check-in mechanism performed by the customer when entering the store and linking the customer identifier to the unique identifier.

13. The method of claim 11, wherein providing further includes identifying the customer as an unknown and unregistered customer with the store.

14. The method of claim 11, wherein receiving further includes processing identifiers associated with each of the decentralized video tracking agents with the metadata and identifying the items taken by the customer while in the store based on the identifiers and the metadata.

15. The method of claim 14, wherein processing further includes reconstructing a transaction for the items taken and the customer and completing payment for the transaction based on a registered payment method associated with the customer.

16. The method of claim 14, wherein processing further includes cross checking the items taken against items being scanned for purchase by the customer at a transaction terminal of the store, and sending an alert when any of the items taken are unaccounted for in the items being scanned.

17. The method of claim 14, wherein processing further includes issuing an alarm within the store when the items taken are unpaid for and the customer is approaching an exit of the store based on the metadata.

18. A system, comprising:
a server having a hardware processor that executes computer instructions representing a video transaction manager; and
a plurality of cameras, each camera having a hardware processor that executes computer instructions representing an object tracker agent;
wherein the video transaction manager is configured to: i) provide a unique identifier for a customer to a first one of the object tracker agents, ii) receive final metadata from at least one of the object tracker agents, iii) process the final metadata to identify items taken by the customer, and iv) process an automated action based at least in part on the items taken;
wherein the object trackers are each configured to: a) link the unique identifier to metadata that represents images of the customer, b) perform image processing on video frames captured by the camera associated with that object tracker, c) produce, modify, or delete portions of the metadata that represents the items taken by the customer, d) produce final metadata from the metadata, and e) deliver the final metadata to the video transaction manager as a record that can be processed by the video transaction manager to identify the items taken by the customer.

19. The system of claim 18, wherein the video tracking manager is further configured in, iv), to: process the action to one of: complete a transaction and payment for the transaction based on the items taken and the unique identifier, verify a transaction terminal transaction of the customer based on the items taken, and raise an alert and/or an alarm based on a location for the last one of the object tracker agents and the items taken.

* * * * *